United States Patent [19]
Byron

[11] Patent Number: 5,201,017
[45] Date of Patent: Apr. 6, 1993

[54] OPTICAL COMMUNICATIONS SYSTEMS

[75] Inventor: Kevin C. Byron, Bishop's Stortford, Great Britain

[73] Assignee: STC PLC, London, England

[21] Appl. No.: 606,052

[22] Filed: Oct. 30, 1990

[30] Foreign Application Priority Data

Nov. 15, 1989 [GB] United Kingdom ............... 8925818

[51] Int. Cl.$^5$ ............................................. G02B 6/26
[52] U.S. Cl. ........................................................ 385/24
[58] Field of Search ........................................... 385/24

[56] References Cited

U.S. PATENT DOCUMENTS

| 4,741,587 | 5/1988 | Jewell et al. | 350/96.15 |
| 4,881,788 | 11/1989 | Doran | 385/16 |
| 4,932,739 | 6/1990 | Islam | 385/15 X |
| 4,962,987 | 10/1990 | Doran | 385/122 X |

FOREIGN PATENT DOCUMENTS

| 0231016 | 8/1987 | European Pat. Off. |
| 0272162 | 6/1988 | European Pat. Off. |
| 0320175 | 6/1989 | European Pat. Off. |
| 2116391 | 9/1983 | United Kingdom . |

OTHER PUBLICATIONS

Patent Abstract of Japan, vol. 12, No. 310 (E 648–(3157) and JP-A-63-076532, 6 Apr. 1988.
Electronics Letters, vol. 21, No. 24, 21 Nov. 1985, Stevenge GB. pp. 1133–1134 Chu et al., "Mutual Interaction Beetween of Unequal Amplitudes in Optical Fibre".

Primary Examiner—Akm E. Ullah
Attorney, Agent, or Firm—Lee, Mann, Smith, McWilliams, Sweeney & Ohlson

[57] ABSTRACT

Soliton-type interaction is eliminated in optical fibre communications system by making the fibre appear to be a passive optical pipe to a signal to be transmitted along it. In particular, the signal to be transmitted is intensity modulated and at a first wavelength which is greater than the minimum dispersion wavelength of the fibre by a predetermined amount. This signal is launched simultaneously into the fibre with a signal of dark pulses of the same format but at a wavelength less than the minimum dispersion wavelength by the predetermined amount. As a result the light transmitted in the fibre is of constant intensity and soliton-type effects, which rely on intensity variation for their formation, do not occur.

3 Claims, 1 Drawing Sheet

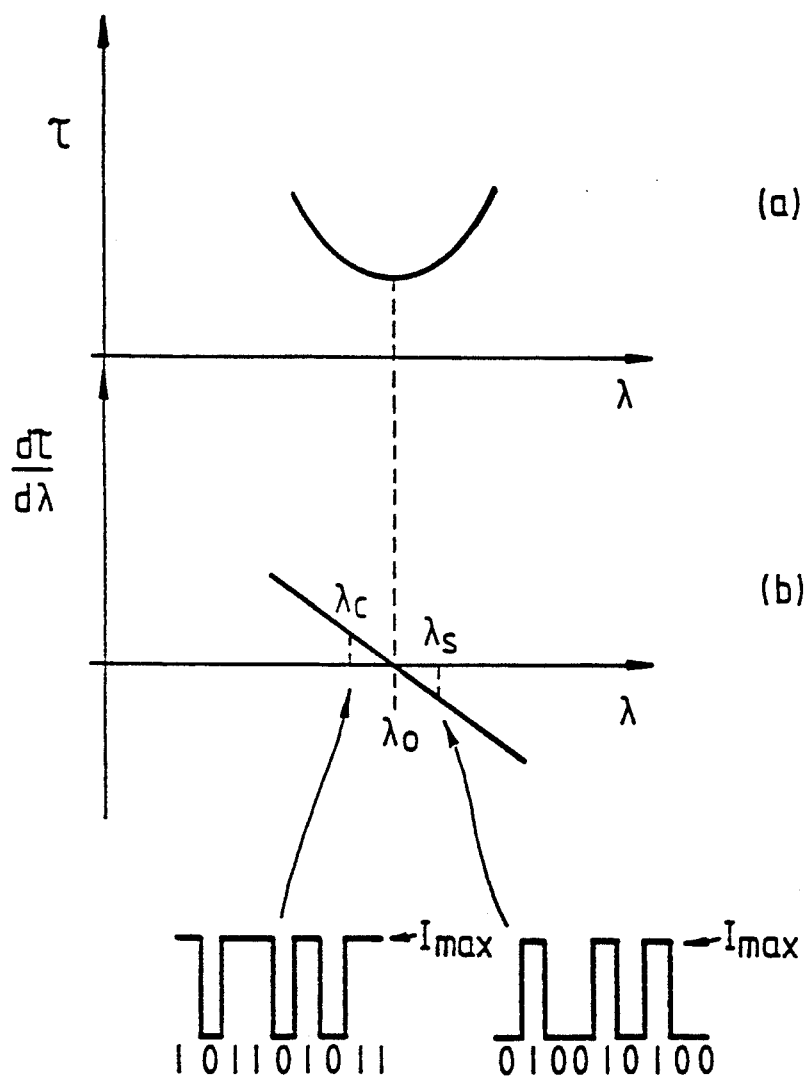

OPTICAL COMMUNICATIONS SYSTEMS

BACKGROUND OF THE INVENTION

This invention relates to optical communications systems and in particular to those involving pulse transmission at high bit rates over long lengths of optical fibre, that is 1000 kilometers or longer.

When solitons are transmitted over such lengths, it has been found that they can attract and repel each other. Thus even soliton systems have problems, although these can be accommodated by suitable, although extensive, system design change. It has also been suggested that in conventional optical systems, for lengths of 1000 Km or more then there may be adverse effects due to soliton-like attraction and repulsion. Thus if conventional optical systems are to employ greater bit rates and involve longer fibre lengths, and this soliton attraction/repulsion effect does occur, a means to overcome the latter will be desirable.

SUMMARY OF THE INVENTION

According to one aspect of the present invention there is provided a method of eliminating soliton-type interaction in an optical fibre communications system comprising the step of causing the optical fibre to appear, to a signal to be transmitted therealong, to be a passive optical pipe.

According to another aspect of the present invention there is provided a method of eliminating soliton-type interaction in an optical fibre communications system wherein a signal to be transmitted is in intensity modulated format and is to be transmitted in the fibre at a first wavelength with which is associated a first delay, and including the step of simultaneously launching into the fibre the signal to be transmitted and a signal comprising dark pulses of the same format as the signal to be transmitted but at a second wavelength with which is associated a second delay, the wavelengths being chosen so that the delays are equal whereby the light transmitted by the fibre is of constant intensity.

BRIEF DESCRIPTION OF THE DRAWING

An embodiment of the invention will now be described with reference to the accompanying drawing which shows (a) the variation of relative delay $\tau$ with wavelength $\lambda$, (b) the corresponding variation of $d\tau/d\lambda$ with wavelength.

DESCRIPTION OF THE PREFERRED EMBODIMENTS

The soliton-type interaction effects can be overcome by making the fibre appear to be a passive optical pipe. The $\tau$ versus $\lambda$ curve has a minimum at $\lambda_o$, the minimum dispersion wavelength. The following assumes that the optical communications system is operated on the longer wavelength side of $\lambda_o$ at $\lambda_s$, which is where the soliton effects would be seen, and that the signal is in intensity modulated format, maximum intensity $I_{max}$.

An example of an input pulse train at wavelength $\lambda_s$ is indicated i.e. 010010100. In order to compensate for soliton effects it is proposed also to transmit another signal at the same wavelength separation from $\lambda_o$ but on the "low" wavelength side thereof, i.e. at wavelength $\lambda_c$. This other signal consists of "dark" pulses so that for every switching on of a pulse at $\lambda_s$ there is a switching off of a pulse at $\lambda_c$ i.e. the pulse train at $\lambda_c$ is, in this example, 101101011.

The signal to be transmitted and a signal consisting of dark pulses of the same format as the signal to be transmitted are launched simultaneously into the transmission fibre. Whilst these signals are at different wavelengths $\lambda_c$ and $\lambda_s$ they are spaced apart from the minimum dispersion wavelength by the same amount so that there is no pulse walk-off. In other words, whilst the pulses are of different wavelength the latter are chosen to be on opposite sides of $\lambda_o$ and such that they experience equal delay so that they will travel at the same speed and remain locked together. The two signal pulse trains are added together in the transmission fibre, which will then only see, in terms of intensity, constant light although of course the wavelengths are different, hence there is no self phase modulation (SPM) apart from the spectral broadening due to $I_{max}$. At the end of the fibre to which the two signals are transmitted, means are provided to separate the two signals, for example a wavelength demultiplexer, whereby to obtain the transmitted information (the input pulse train). Whilst the signal to be transmitted is referred to above as being on the "high" side of $\lambda_o$, with the dark pulses on the "low" side thereof, alternatively the signal to be transmitted can be at the "low" side ($\lambda_c$) and the dark pulses at the "high side ($\lambda_s$).

The soliton effects require a change in intensity, the rate of change of intensity $dI/dt$ providing the self-phase modulation (SPM) which results in the solitons. By making the intensity constant, $dI/dt$ is eliminated, and so far as the fibre is concerned the dynamic Kerr effect does not exist as it is seeing constant light, hence the soliton-type attraction and repulsion does not occur. Thus soliton-type interaction in conventional optical fibre systems can be eliminated, enabling such systems to be used with high bit rates and long fibre lengths.

I claim:

1. A method of eliminating soliton-type interaction in an optical fibre communications system including the steps of launching a first pulsed signal into one end of an optical fibre of the system for transmission therealong to the other end of the optical fibre, which first pulsed optical signal is transmitted at a first wavelength with which is associated a first delay, and simultaneously launching into the one end of the optical fibre a second pulsed optical signal, which second pulsed optical signal comprises dark pulses of the same format as the first pulsed optical signal but at a second wavelength with which is associated a second delay, the first and second wavelengths being chosen so that the delays are equal whereby the light transmitted by the optical fibre is of constant intensity and soliton-type interaction between the pulses of the first pulsed optical signal is prevented.

2. A method as claimed in claim 1 characterised in that the first wavelength is greater than the minimum dispersion wavelength of the optical fibre and spaced apart therefrom by the same amount as the second wavelength which is less than the minimum dispersion wavelength.

3. A method of eliminating soliton type interaction in an optical fibre communication system characterised by the steps of launching a pulsed optical signal into one end of an optical fibre of the system for transmission therealong to the other end of the fibre, and reducing the effect of non-linearity in the optical fibre so that for the pulsed optical signal the fibre appears to be transmitting constant intensity light whereby soliton-type interaction between the optical pulses is prevented.

* * * * *